(12) United States Patent
Robertazzi et al.

(10) Patent No.: US 6,370,560 B1
(45) Date of Patent: *Apr. 9, 2002

(54) LOAD SHARING CONTROLLER FOR OPTIMIZING RESOURCE UTILIZATION COST

(75) Inventors: Thomas G. Robertazzi, Mastic; Serge Luryi; Saravut Charcranoon, both of Stony Brook, all of NY (US)

(73) Assignee: Research Foundation of State of New York, Stony Brook, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/042,132

(22) Filed: Mar. 13, 1998

Related U.S. Application Data

(63) Continuation-in-part of application No. 08/717,696, filed on Sep. 16, 1996, now abandoned.

(51) Int. Cl.[7] .................................................. G06F 9/00
(52) U.S. Cl. ........................ 709/105; 709/100; 709/102
(58) Field of Search ................................. 709/100, 102, 709/105; 370/238, 400, 434; 708/446

(56) References Cited

U.S. PATENT DOCUMENTS

| | | | | |
|---|---|---|---|---|
| 4,769,771 A | * | 9/1988 | Lippmann et al. | 709/213 |
| 5,079,760 A | | 1/1992 | Nemirovsky et al. | 370/238 |
| 5,283,897 A | * | 2/1994 | Georgiadis et al. | |
| 5,392,429 A | | 2/1995 | Agrawal et al. | |
| 5,418,953 A | * | 5/1995 | Hunt et al. | 709/102 |
| 5,524,077 A | * | 6/1996 | Faaland et al. | 705/8 |
| 5,694,602 A | * | 12/1997 | Smith | 709/105 |
| 6,014,612 A | * | 1/2000 | Larson et al. | |
| 6,223,205 B1 | * | 4/2001 | Harchol-Balter et al. | 709/105 |

OTHER PUBLICATIONS

Alonso, "An experimental evaluation of load balancing strategies," *Miami Technicon '87*, vol. 21, No. 5, Oct. 1987, pp. 225–228.

Banawan et al., "A comparative study of load sharing in heterogeneous multicomputer systems," 25th Annual Simulation Symposium, Apr. 1992, pp. 22–31.

Bataineh et al., "Bus–oriented load sharing for a network of sensor driven processors," *IEEE Transactions on Systems, Man and Cybernetics*, vol. 21, No. 5, Sep. 1991, pp. 1202–1205.

Bernard et al., "A survey of load sharing in networks of workstations," *Distributed Systems Engineering*, vol. 1, No. 2, pp. 75–86.

Bharadwaj et al., "Optimal Sequencing and Arrangement in Distributed Single–Level Tree Networks with Communication Delays," *IEEE Transactions on Parallel and Distributed Systems*, vol. 5, No. 9, Sep., 1994, pp. 968–976.

(List continued on next page.)

*Primary Examiner*—Zarni Maung
*Assistant Examiner*—George L. Opie
(74) *Attorney, Agent, or Firm*—Baker Botts LLP

(57) ABSTRACT

A load sharing system which minimizes overall costs by assigning segments of a divisible load to distributed processor platforms based on the resource utilization cost of each processor platform. The distributed processor platforms are connected via data links which also have associated resource utilization costs. A controller divides a divisible load or task and assigns each segment of the load or task to a processor platform based on the processor platform's resource utilization cost and data link cost. After the initial allocation, an optimizing reallocation is performed to reduce the overall monetary cost processing the load or task. The optimization can be performed using a pair-wise swapping technique.

37 Claims, 10 Drawing Sheets

OTHER PUBLICATIONS

Cazabon et al., "A Policy Independent Metric for Process Selection in Distributed Systems," Nineteenth Annual International Computer Software and Applications Conference, Aug. 1995, pp. 212–217.

Haddad, "Optimal load sharing in dynamically heterogenous systems," Seventh IEEE Symposium on Parallel and Distributed Processing, Oct. 1995, pp. 346–353.

Menascé et al., "Cost–Performance Analysis of Heterogeneity in Supercomputer Architectures," *IEEE*, May 1990, pp. 169–177.

Phillipe et al., "Distributed Scheduling for Multicomputers," High–Performance Computing and Networking Conference, Apr. 1995, pp. 344–349.

Wang et al., "Load Sharing in Distributed Systems," *IEEE Transactions on Computers*, vol. C–34, No. 3, Mar. 1985, pp. 204–217.

* cited by examiner

| PROCESSOR PLATFORM NUMBER | STATUS | SPEED | COST PER TIME SEGMENT | DATA LINK COST |
|---|---|---|---|---|
| 1 | BUSY | 200 MHz | $4 | $.05 |
| 2 | AVAILABLE | 300 MHz | $6 | $.03 |
| 3 | AVAILABLE | 100 MHz | $3 | $.08 |

FIG. 1C

| NUMBER OF PAIRS | AVERAGE NUMBER OF ITERATIONS |
|---|---|
| 5 | 6.04 |
| 6 | 8.53 |
| 7 | 11.59 |
| 8 | 15.11 |
| 9 | 19.17 |
| 10 | 23.77 |
| 11 | 28.63 |
| 12 | 34.31 |
| 13 | 40.46 |
| 14 | 47.36 |
| 15 | 54.53 |

FIG. 9

LOAD SHARING CONTROLLER FOR OPTIMIZING RESOURCE UTILIZATION COST

SPECIFICATION

This application is a continuation-in-part of U.S. application Ser. No. 08/717,696 entitled "LOAD SHARING CONTROLLER FOR OPTIMIZING MONETARY COST" filed on Sep. 16, 1996, now abandoned. The disclosure of the aforementioned U.S. patent application Ser. No. 08/629,237, now U.S. Pat. No. 5,870,502 is hereby incorporated by reference into this application.

TECHNICAL FIELD

The present invention relates to a load sharing controller for optimizing the resource utilization cost of computation of the distributed processors within a networked system.

BACKGROUND OF THE INVENTION

Parallel processing techniques divide computer jobs among at least two separate processors to gain computational efficiencies when operating on a large group of data, called a load, or when multiple tasks are required to be performed to complete the operation. It is often more efficient, where possible, to divide a job for concurrent processing among multiple processors in order to complete the computations in a shorter period of time. Loads and tasks to be processed can either be characterized as indivisible or divisible. An indivisible load or task is one that cannot be divided into two or more smaller fragments to be distributed among multiple processors but requires that the load be processed by a single processor.

A divisible load is a load that can be arbitrarily partitioned in a linear fashion for data or by task and can be distributed to more than one processor to achieve a faster solution time. An example of a divisible load is a very long linear data file associated with a simple operation such as the summation of a large set of numbers. Intermediate sums of the list of numbers can be computed on different distributed processors and then later recombined and added together to gain the final solution. A simple example of a divisible task can be shown in the form (3+5)×(8+2). The first two numbers can be added together at the same time as the last two numbers. Of course, this principle of a divisible task is typically applied to much more complex operations where parallel efficiencies would be beneficial.

A more sophisticated example of a divisible load is data representing an input waveform which is to be applied to a series of digital filters to identify the waveform. The data can be segmented and processed on different processors in order to expedite the required computation period. In general, the class of divisible loads includes problems where a number of repetitive and independent operations are performed on very large data files. Examples of divisible loads commonly appear in the areas of signal processing, image processing, massive experimental data, cryptography and experimental data processing. Divisible load theory has the benefit of being completely deterministic without requiring any statistical or probabilistic assumptions. Divisible load theory is generic and therefore robust to changes in underlying network and processing technologies.

Divisible tasks can also be used in the example of these digital filters. Different processes can be used to apply different portions of the filter to an input signal. By segmenting necessary operations, the overall speed of the calculation will be reduced greatly when complex operations are being performed. A divisible task can be an operation that is repeated a very large number of times. For example, a cryptographic operation may attempt to decode enciphered information using one million keys. The individual key attempts can be spread over a number of processors to decrease both the time and dollar cost of performing the operation.

When a divisible load or task is distributed to a number of processors, there is a need for a central controller, which can be one of the processors, to select which processor gets which portion of the load or task and in what order. One scheme is to assign the fastest processor (in terms of computational speed) with as much data as possible within a given time constraint. This speed based load sharing approach must take into account the number of available processors, the speed of each processor, the speed of the communication links, the load origination point and the network architecture.

Previous allocations of controllers have been based solely upon processor speed among networked processors in order to gain time efficiencies by parallel processing the divisible load or task. As computer hardware and communications technology are quickly advancing, an opportunity to link processors located at different remote sites together to compute a load is promising. The Internet currently allows for the fast and cheap communication between processors irrespective of their physical locations. Indeed, the Internet allows for worldwide communication on a relatively inexpensive basis.

Communication costs of the conduit linking a distributed process to the controller (e.g., telephone line charges) are one of the resource utilization costs associated with distributed processing. Different processors also have varied associated resource utilization costs themselves. One minute of processor time on a supercomputer is many orders of magnitude more expensive to operate than on a simple 486 computer platform. Businesses now have the capability of renting out their idle processor time to other users when connected in a global network such as the Internet. Ross Perot, founder of Electronic Data Systems of Texas, made a business out of renting idle time on private mainframe computer installations to run programming. The increased number of different types of processors with varied associated resource utilization costs creates a need for a load sharing controller which assigns divisible loads among distributed processors to minimize the overall resource utilization cost to process the load or task.

SUMMARY OF THE INVENTION

The present invention includes a controller for the allocation of divisible load jobs among a plurality of distributed processor platforms based on their resource utilization costs. The system includes a plurality of processors and a network for connecting the distributed processors where one of the processors is a controller for dividing the computer job to be processed into segments and assigning the segments to the distributed processor platforms based on each processor platform's associated resource utilization cost. The allocation can also be further based on an associated data link cost with each processor platform.

The resource utilization cost of a processor includes the operational cost of the processor itself and the platform upon which it runs. The resource utilization cost can also include a percentage of the purchase price of the computer platform so that the owner of the processor can recoup some of its initial investment. Alternatively, the resource utilization cost can be preselected by the manager of the processor platform and based on such factors as the supply and demand of the processor platform. The controller determines the resource utilization cost of a distributed processor by either polling the processor, checking a predetermined memory location with the information or by calculating the resource utilization cost based on known information.

The controller also optimizes its distribution by allocating portions of the load from a more expensive processor platform to a less expensive processor platform while still maintaining an acceptable finish time to complete the job. The controller can also minimize the finish time of the processors while remaining at or below the cost ceiling.

BRIEF DESCRIPTION OF THE DRAWINGS

Further objects, features and advantages of the invention will become apparent from the following detailed description taken in conjunction with the accompanying figures showing a preferred embodiment of the invention, on which:

FIG. 1C shows a data file which is stored in the memory of FIG. 1B;

FIG. 9 shows a data table of the average number of iterations required to reach a minimum overall monetary cost for a given number of processor platform pairs.

DETAILED DESCRIPTION

Figure 1A:
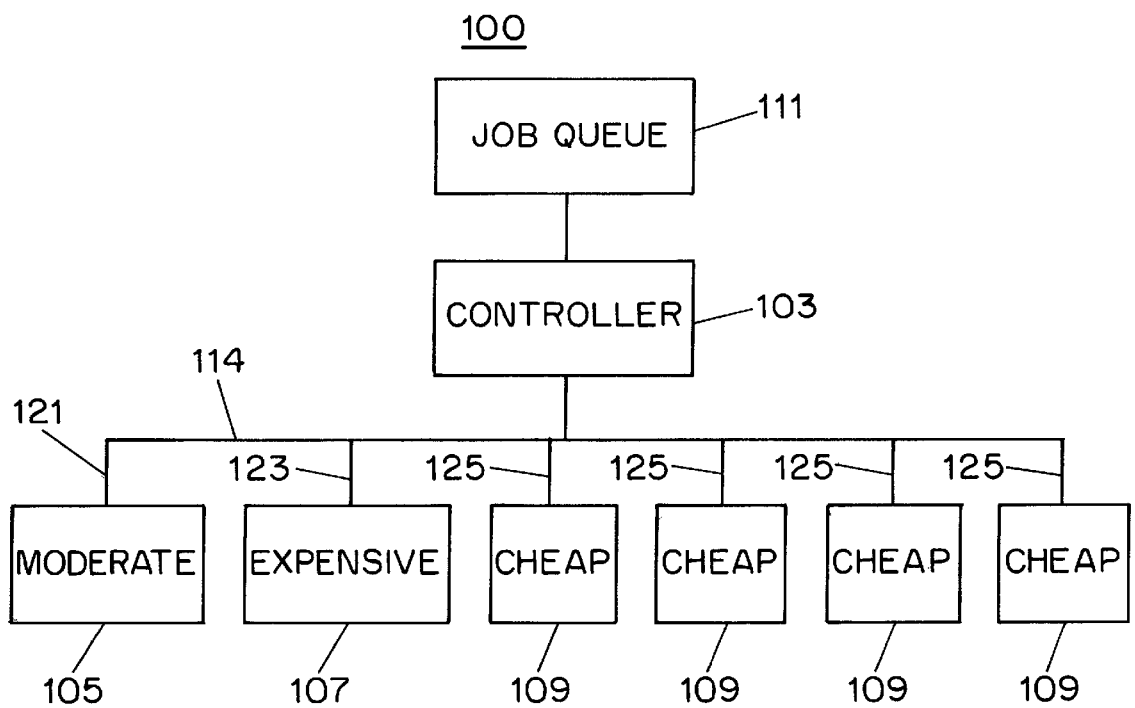
FIG. 1A shows a block diagram of a system for load sharing a divisible job among distributed processors based on monetary costs in accordance with the invention.

Divisible loads and tasks which can be parallel processed are becoming more common as storage capacities and the speed of processors are increasing to handle large computing jobs. The variety of different types of processors capable of processing divisible loads or tasks is also increasing dramatically. Personal computers now have a number of different types of processors which operate at many different speeds and have varying costs associated with them. These processors include the 386, 486, pentium and the P6. Also available for distributed jobs are computer platforms including work stations, mini-computers, supercomputers as well as mainframes. New technologies such as GaAs circuitry and chips operating at cryogenic temperatures are becoming available. Proprietary software which maximizes utilization of processing operations is also progressing rapidly. These processor platforms are becoming easier to interconnect through different types of networks and other data conduits and allow communication between one another. The increasing advances in the Internet area and other networks are also facilitating processor cooperation. Thus, a divisible load or task can be segmented and have its portions be simultaneously processed on different types of computer platforms including a 486 computer, a work station and a supercomputer. Each of the individual processors or group of processors could be a computer "utility" which leases computer time to other users.

Each different type of processor platform has an associated resource utilization cost when used to process a portion of a load. The platform includes the processor, supporting electronics and devices necessary for the processor's operation (e.g., the "motherboard"). The resource utilization cost of a processor includes factors such as the monetary computing cost whose unit is "cost per second" and the computing speed whose unit is "loads/tasks per second". The unit "load/task" in the computing speed parameter is of predetermined size or task magnitude in order to be able to compare different processors using the same parameters. The monetary cost for a processor for a unit load is the computing cost times the inverse of the computing speed to produce a parameter with the unit "cost per unit load/task". For example, if a 486 platform computer has a computing cost of $5/second and a computing speed of two loads/tasks per second, the monetary cost of processing a unit load/task is $2.50. If a mini-computer platform has a computing cost of $10/second and a computing speed of eight loads/tasks per second, the cost of processing a unit load/task is $1.25. Therefore, the operating cost of the mini-computer processor is cheaper than the 486 due to its vastly increased speed relative to its computing cost. However, additional costs make up the whole resource utilization costs for a processor platform. These costs are addressed below.

The resource utilization cost of a processor is based upon a number of factors which could include the operating cost of the processor platform, the initial purchase price of the processor platform, and the data link costs between the distribution processor and the controller processor. The operating cost component can include power costs, environmental costs, maintenance to the processor and any other charges associated with the running of the processor and platform. The purchase price of the processor and platform can be depreciated over the useful life of the processor and charged as an expense to temporary users utilizing the processor as part of the load-sharing technique. The data link costs can include charges by a network operator, costs of purchasing and upkeeping the network and costs due to delays in the network. An alternate calculation could be based upon the value of alternative jobs which could be processed by the processor during the time spent processing the segment of the load (a lost opportunity cost). This approach may lead to optimizing the largest rental income for each processor while minimizing the monetary costs for a single job.

Another environment where monetary cost is an important factor in the load sharing process is one in which each processor in a network has an individual predetermined charge rate. One example of this situation occurs in a university which allocates the cost of purchasing and operating a processor by internally charging out the time used on a processor to each user or department. It is advantageous for a user of the university system to use the controller which allocates divisible loads among linked processor platforms based on the monetary cost associated with each processor. The use of the controller achieves the cheapest solution within a selected finish time. Distributing the load generally achieves a faster processing time than if the load was processed on a single processor and the controller minimizes the overall cost of processing the load. Another example of a resource utilization cost-based load sharing technique occurs in a corporation with a large number of networked processors which allow multiple loads or tasks to be optimally distributed among the processors within the company's control.

Still another example is the use of the Internet or other wide area network to locate and utilize available processing time for very large jobs. For example, a continuous stream of data from a space probe could be processed by distributed processors connected by the Internet.

FIG. 1 shows a system 100 which performs a load sharing operation based upon the resource utilization cost of each processor. The system in the preferred embodiment includes a controller 103, a job queue 111, a local network 114, a processor platform 107 with a high associated resource utilization cost, a processor platform 105 with a moderate resource utilization cost, a group of inexpensive processor platforms 109 with relatively low resource utilization costs and data links 121, 123 and 125. The controller 103 can be one of the distributed processor platforms and process a portion of the load as well as act as the controller. Alternatively, the control processor can be dedicated to properly distributing the load. The number of processor platforms in each resource utilization cost group can vary. Additionally, the number of different resource utilization cost groups of processors can vary. In this example, the high resource utilization cost processor 107 is a mini-computer processor which costs $5/unit load/task to use (the costs are for illustrative purposes only); the moderate cost processor 105 is a supercomputer platform processor which costs $3/unit load/task to use; and the least expensive group of processors 109 is made up of 486 platforms which costs $1/unit load/task to operate. The operation cost and the speed of each processor contribute to the calculation of the monetary cost in this example as described above. Certain processor platforms can attach premium payments if proprietary software or hardware enhances utilization. Thus, for example, the supercomputer could increase its resource utilization cost by 50¢/load if the computer job distributer is willing to pay the premium for its services. The job queue 111 can be any terminal, processor or other electronic unit which provides the controller with a divisible load to be apportioned in the most cost-effective manner among the distributed processors.

The job queue 111 provides the controller with a divisible load or task to be distributed. The job queue 111 can hold multiple jobs (loads) for processing and preferably operates in a First-In-First-Out (FIFO) manner. However, alternate schemes can be used in the job queue including user defined priority flags, a Last-In-First-Out (LIFO) scheme or any other conventional queuing scheme. The network 114 which is connected to data links 121, 123 and 125 can be a Local Area Network, a bus interconnected network or any other conventional network.

Data links 121, 123 and 125 can be any kind of data conduit with an associated monetary cost. For example, a data link can be a telephone line, optical cable or network which costs money to use. Alternatively, the data link can be owned by the user of the load sharer but have operational costs or depreciation cost. Each data link can have its own unique monetary cost which can vary on a daily or even hourly basis. The costs of the data links must be taken into account when optimizing the resource utilization of a processor platform which uses the data link to transmit data to and from the controller 103.

Although in this example the supercomputer platform is more expensive in operating costs, the cost per unit load is lower than that of the mini-computer processor because the magnitude of the increased processor speed offsets the higher operating costs associated with the supercomputer platform. Controller 103 contains the load or task to be divided and distributed to other processors and also will contain the results of the completed jobs. Any job which can be divided into load or task segments will operate with the described load sharing system.

The interaction between the controller and processor platforms and the method employed by the system will be described in detail in connection with FIG. 2; however, a general description follows. The least expensive available processor in the system can be designated to be the controller. When the controller receives a divisible job from the job queue 111, it will first determine the resource utilization costs of any available distributed processor connected to the system's network which can process a portion of the load as well as the processor's data links cost. This can either be performed by an active query to all participating processors connected to the network, or can be extracted from a data location in the controller containing the current costs of available processors and their data links. Each processor can store the value of the cost of the data link to which it is connected or can calculate the cost based upon the location of the controller 103 requesting the information. The control processor can also determine its own resource utilization cost if it is available to process a segment of the load. The controller can link to other individual processors or networks via a modem, dedicated line, the Internet or other connection means.

Figure 1B:
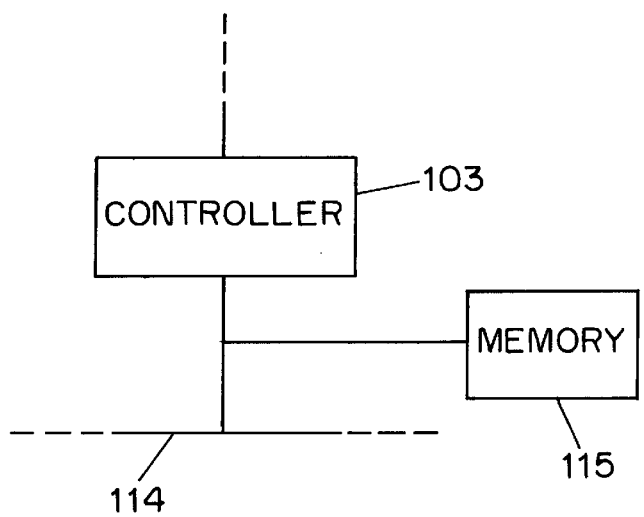
FIG. 1B shows a portion of the system in FIG. 1A further including a memory to store information regarding the distributed processors.

FIG. 1B shows an alternate embodiment of system 100 in which the controller 103 is coupled to a network and is also coupled to an external memory 115. The memory 115 contains the monetary costs and status of each processor platform on the network and their associated data links. A typical file 150 stored in memory 115 is shown in FIG. 1C. Column 181 indicates the participating processors connected to the network. The status column 183 is constantly updated by each of the processors in the network and indicates the processors' status and availability. The speed column 185 indicates the relative speed of the processor platform. The cost column 187 indicates the relative monetary cost of the processor platform in terms of dollars per time spent processing. The cost column and speed column's coefficient will be used to generate a cost/unit task-load. This resource utilization cost amount can be based on a number of cost factors of the processor for which a cost load or task can be processed. Alternatively, the cost can be set by the owner of the processor. Column 189 indicates the data link cost per unit load or task. This number can vary independent of the costs of the associated processor so is stored as a separate value. Additionally, the link cost per unit load can vary depending upon the location of and connections made to the controller 103. Controller 103 can then select the least expensive available process processor and data links in memory 115 to distribute the sections of a divisible load. Memory 115 could also be located in controller 103. Additionally, memory 115 can be located in a central file server or in a web site on the Internet.

Once the resource utilization unit cost of each available processor with its data link is known, the controller 103 will select the cheapest processor platform to allocate the first portion of the divided load. The processor will initially allocate the maximum portion of load which can be processed on that cheapest processor within a selected finish time to complete the entire job. The finish time is selected by the originator of the job or the controller. If no finish time was selected, the least expensive processor could perform all of the functions to minimize the monetary cost but the job would likely be completed after it was needed. The processor will then allocate in succession the remaining portions of the load to the next available cheapest processor platforms. An optimization routine can then be performed to further minimize the overall monetary cost of the job. The optimization can be based upon an incremental increase to the maximum amount of time allowed to finish the entire process and thus reallocate some of the load to the other processors. The loads are then distributed in optimum partitions to the selected distributed processors. After processing, the processed segments of the load, task or intermediate results will be returned to the controller 103 from each selected distributed processor to be integrated to form a completed job result and provide the solution to a selected destination. One example of an intermediate result is an intermediate sum of that portion of numbers assigned to each processor.

The order in which the distributed processors are loaded is important if the communication time between processors in non-negligible. When the communication time is a factor and the controller cannot transmit messages in parallel, it is desirable to load the cheapest available processor platform first so that it can process its segment of the load for the amount maximum time with the selected finish time. As addressed below, the associated monetary cost of the data link connected between the controller and the processor platform is also considered in the allocation. The most expensive processor selected for participation will receive its load last to ensure that the time that it processes the load is the least among the selecting processors in order to minimize the monetary cost.

Figure 2A:
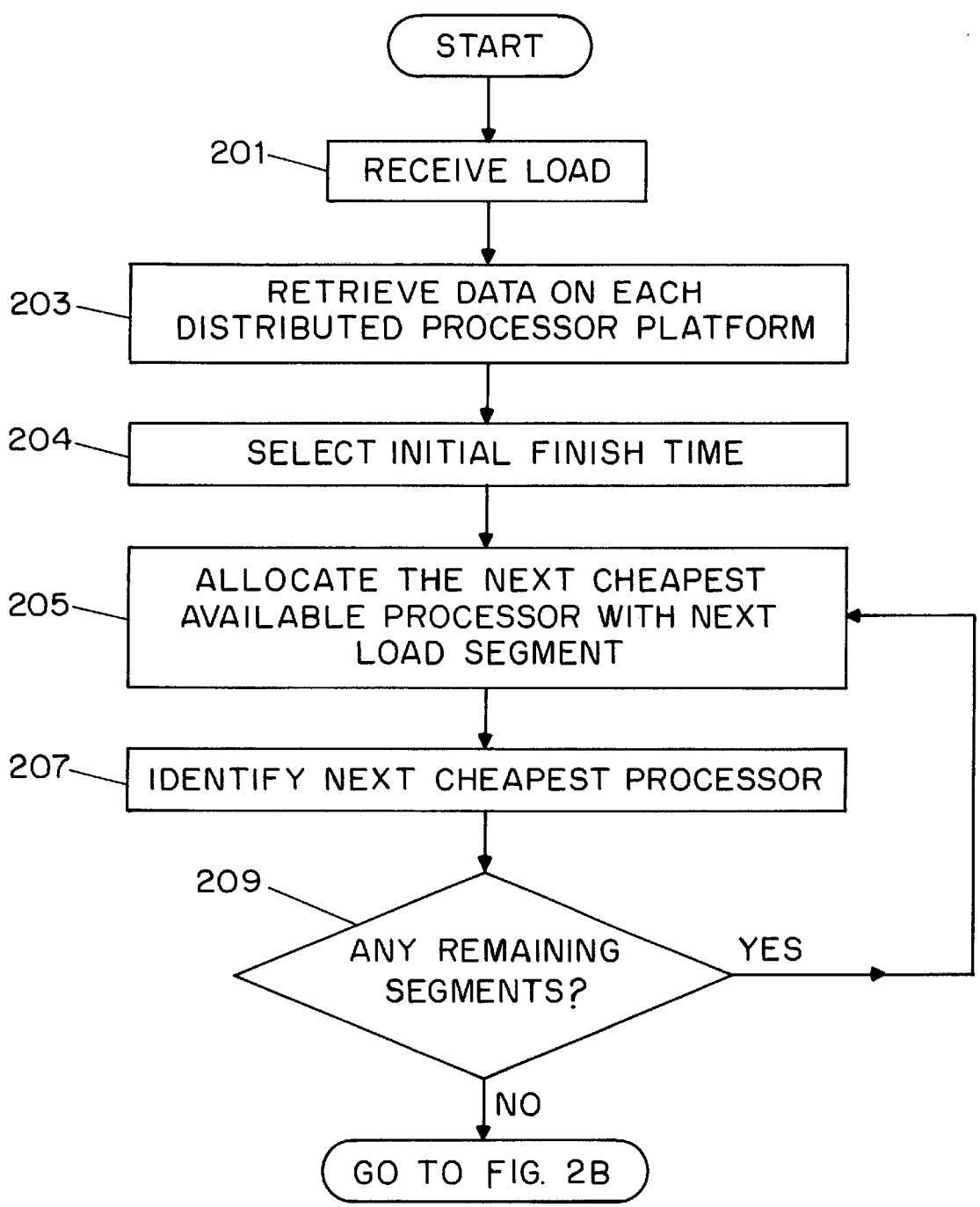
FIGS. 2A, 2B and 2C show the steps of a method for distributing a divisible computer job among two or more processors based on monetary cost.

FIG. 2A shows a flow chart of the steps that are performed in the system 100 when a divisible load is shared among distributed processor platforms. In step 201, the controller 103 receives the divisible load from the job queue 111 to be distributed among at least two processor platforms. The controller can be an independent apparatus or can be a processor in the distributed system. The controller is preferably the least expensive processor platform if it is one from the distributed system. The controller can also be selected to minimize the data link costs associated with the processor platforms to which the controller is connected.

Step 203 retrieves the resource utilization cost information of each distributed processor platform linked in some manner to the controller. The controller may be an available processor. Some processors may be busy working on other applications and not available for the particular job. The resource utilization cost data may be supplied by each distributed processor platform after the controller 103 polls each processor platform on the network. Alternatively, the monetary cost data of the processor platform and associated data link can be loaded from an internal or external memory which is periodically updated by each processor. Another method of obtaining cost information is to have the distributed processor platforms supply such factors as their operating cost data and operating speed data from which the controller 103 can calculate the effective cost per load for the processor. The costs of the associated data links can also be calculated. Additionally, the controller 103 may simply access a memory containing data including the type of each processor and data link to allow the controller to estimate the approximate resource utilization cost of the platform and data link.

The controller next divides the load or task into segments which can be processed separately in steps 205 to 209. The segments can be of different sizes which depend on the speed and cost of the distributed processor platforms used. The number of segments also depends upon the selected finish time and the types of available processor platforms used. The selected finish time data can be sent with the divisible load to the controller, can be predetermined for the system, or can be determined by the controller. One example of a divisible load is a list of data to be searched that can be divided into three segments and processed on three different distributed processors, where each processor performs a search routine on its particular segment. The assigning and optimization of the load distribution are performed prior to physically sending the load segments to each distributed processor.

Step 204 selects an initial finish time constraint which is the maximum time the distributed platforms can take to perform the calculations. If the finish time had no time constraint or a very long time constraint such as a week, the entire processing could be done on the cheapest processor platform to minimize resource utilization costs. More typically, a user of the load sharing controller will have a shortened time constraint which will require distribution of the load or task among multiple processors with different resource utilization costs. The finish time can be directly entered by a user, can be defined by another program, can be present for a system or can be determined by any other conventional means.

Step 205 allocates the cheapest available participating processor platform (based on the cost/unit load-task) in the network with a divided segment of the load. When the initial cheapest processor is identified, it will be allocated with the first divided segment of the load or task. The load or task will be divided so that the segment will fully utilize the cheapest processor for the entire selected finish time constraint. The proportional segmentation can be calculated based upon the speed of the distributed processor and its associated data link which can be found in the similar manner as the monetary cost such as by polling or having the data stored in a central memory. The distributed processor just allocated will then change its availability status to "busy" to indicate it is not currently available for other loads. Then, in later steps, subsequent available distributed processors with the lowest monetary cost will be allocated with the remaining segments of the load or task.

Step 207 identifies the next cheapest available processor platform which is to be assigned an unprocessed segment of the load or task. The processors which already have been allocated a segment of the load are no longer available for the initial allocation. A complete list of available processors could be formed and updated in step 203 so that step 207 will have already been performed. However, in the preferred embodiment, the network is checked for new additional processors which have become available and which may have a relatively cheaper monetary cost.

Step 209 checks if there are any remaining segments of the load to be processed. If there is, then the method jumps back to step 205. If there is not, then the initial loading allocation is complete. At this point, the load or task segments have not been physically sent to the processor platforms because further optimization will be performed as described below.

Figure 2B:
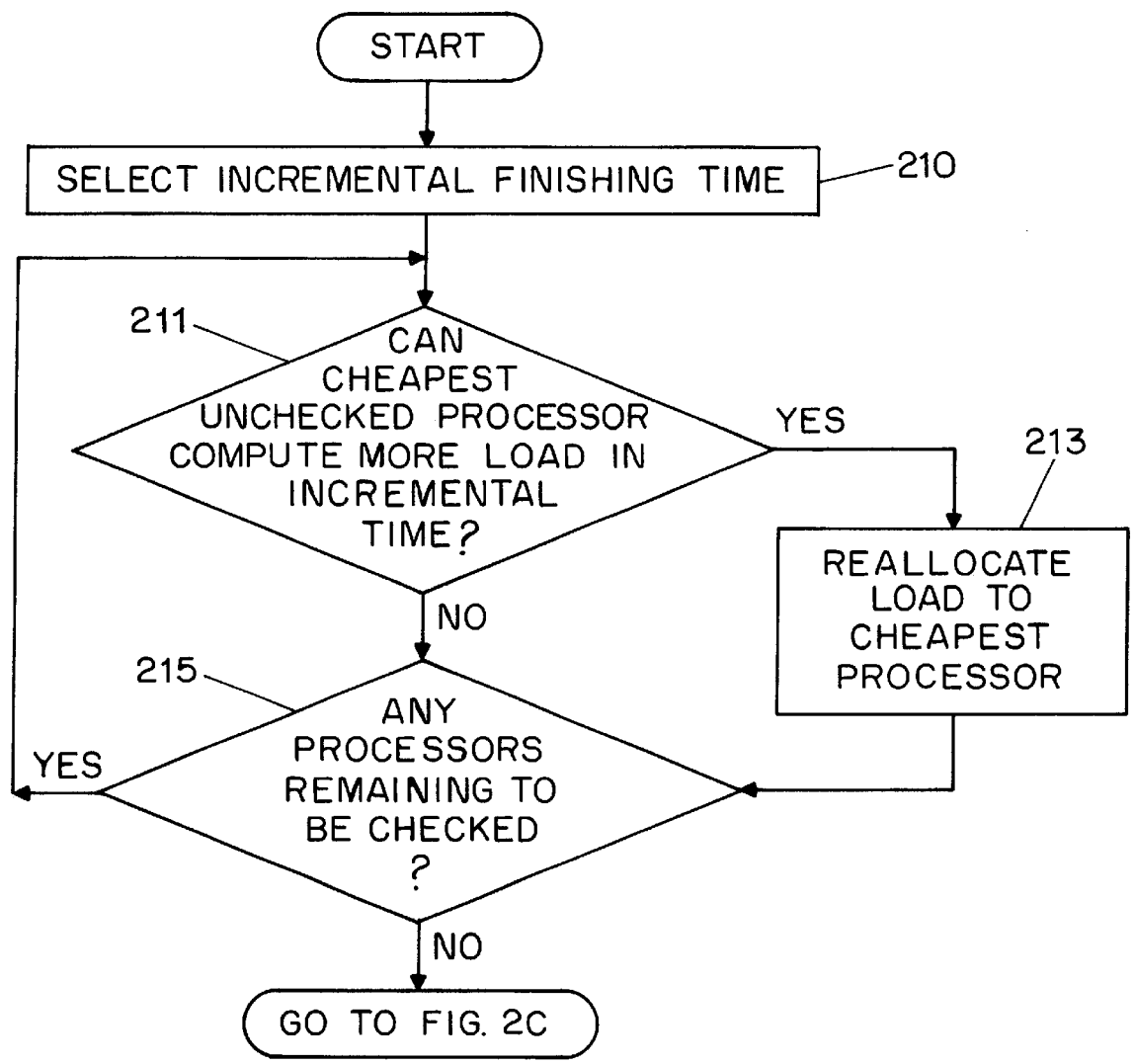

FIG. 2B shows a flow chart of the steps of further optimization to reduce the overall resource utilization cost of the distributed processors and their associated data links.

Steps 210 to 215 optimize the original load sharing allocation to distributed processors in order to provide the lowest resource utilization cost processor platform with a larger share of the load while extending the finish time incrementally. This optimization will drive down the overall cost of processing the load thus becoming more cost efficient.

Step 210 selects the amount of incremental time which will increase the finish time while reducing the overall monetary cost of processing the distributed job. The controller receives the selected incremental time from the originator of the job via the network, an input device connected to the controller or other conventional means. The controller can also use a default incremental time if the user wishes to reduce costs. A user may model the trade offs of a longer finishing time versus a lower overall monetary cost and select the best time/money allocation. The model can be run prior to the allocation or during the allocation depending upon the circumstances of the job being run. The user may decide that an extra hour of processing finish time is acceptable if the overall costs can be reduced by a large amount, e.g., by twenty percent.

Step 211 checks if the cheapest processor used to process a segment of the job can process an additional portion of the load or incremental task within the selected increased finish time constraint. A divisible load or task by definition can be subdivided into as many parts as necessary. For example, if a very large distributed load is initially segmented and allocated to be completely processed in thirty minutes to reduce costs, and the selected incremental finish time is one minute, the load controller 103 will reallocate a divisible portion of the load equal to one minute of processing time from the most expensive processor platform to the least expensive processor platform and associated data link costs. If the cheapest processor platform is fully allocated for the selected incremental finish time period, the next cheapest processor platform is checked to determine if it could process a portion of the most expensive processor's load within the incremented time period.

Step 213 reallocates a portion of the most expensive processor's load to a cheaper processor's load which will be able to complete execution by the initial finish time plus the incremental finish time. If the segment of the load assigned the expensive processor platform is completely reallocated to cheaper processor platforms, the expensive processor platform will no longer be used and will become available for other jobs that require processing.

Step 215 determines if there are any processors remaining which have not had their loads reallocated during the optimization technique. If there are additional cheaper processors not yet checked and which can process additional loads or tasks within the incremental finish time, the method jumps back to step 211. If there are no unchecked processors, then the optimization is complete and the method continues with the steps in FIG. 2C.

Figure 2C:
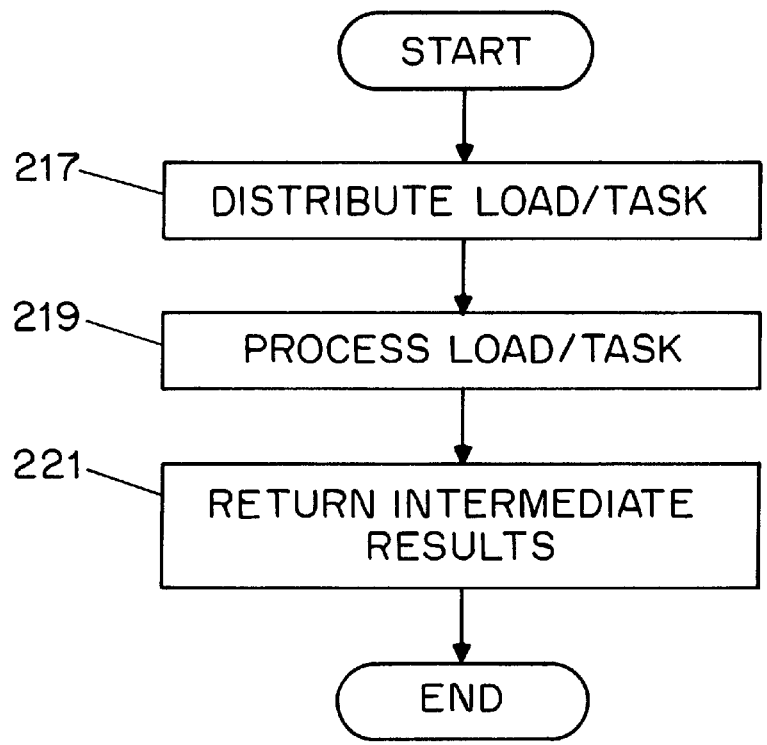

FIG. 2C is a flow chart of the steps used to physically distribute the segmented load after the optimization techniques have been performed. Step 217 transmits the load or task segments to the selected processor platforms using the determined allocation in the previous steps. The cheapest available processor platform will be sent its allocated portion first and the other selected processor platforms will be sent their portion in an ascending order according to the resource utilization cost of each processor platform. Alternatively, smaller portions of each allocated segment can be sent to each processor so that the processor platforms can begin to operate on their load segment sooner. The controller would keep distributing the remaining smaller segments until all the allocated segments are distributed.

Step 219 processes each of the allocated load or task portions on the assigned distributed processor platforms. Each load is processed on a distributed processor platform as soon as it is received from the controller.

Step 221 returns the intermediate results of all the segments of the divisible loads which were processed on the distributed processor platforms to the controller. This function may entail further calculations such as adding the intermediate results together or concatenating the resultant data from each processor together to form a solution. Alternatively, the results of task segments can be further processed to reach a solution. The job result is then complete. It can be stored in a memory, delivered back to the originator of the job or selected destination, displayed to an operator or used in any selected way.

Figure 3:
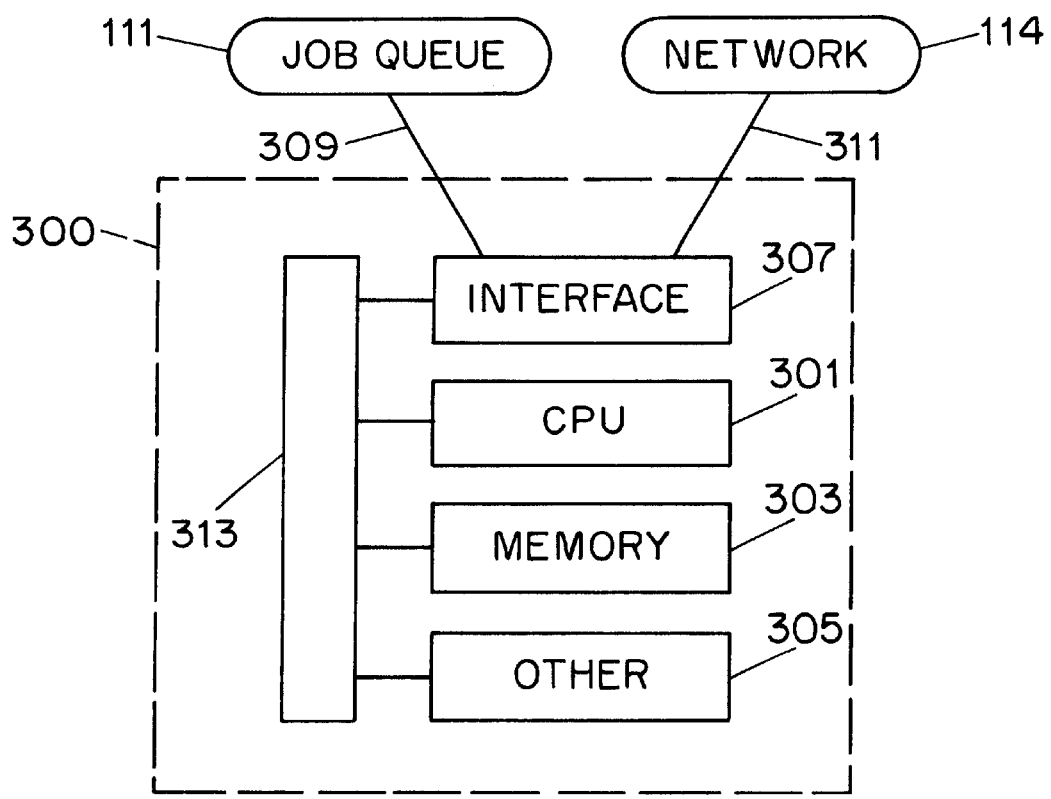
FIG. 3 shows a block diagram of a controller which operates in the system of FIG. 1.

FIG. 3 is a block diagram of a load or task sharing controller used in the present invention. The controller 300 includes a central processing unit 301, a memory 303, other conventional electronics necessary for the operation of the controller 305 and interface 307. Each of the components is coupled by a conventional data bus 313. Interface 307 is connected by transmission lines 309 to both the job queue 111 and the network 114. Alternatively, job queue 111 can be a part of controller 103 using memory 303. The interface 307 may be large enough for both job queue 111 and network 114 to be simultaneously connected or interface 307 may have a switching ability. The load is transmitted from the job queue 111 over transmission lines 309 to interface 307. The load is then stored in memory 303 and partitioned into smaller loads to be assigned among a number of distributed processor platforms.

The CPU 301, which controls the operations of the controller 300, determines the available distributed processors connected to network 114 by either polling the processors or checking a predesignated memory location located in memory 303, in a memory location connected to network 114 or some other storage location accessible by the controller 300 which lists the cheapest available processor platforms and associated data links. The loads are then allocated to each of the distributed processor platforms, starting with the cheapest processor platform and data link. In one embodiment, CPU 301 then checks the possibility of the cheaper processors to take on additional segments of the load to be completed within the selected incremented finish time constraint. If the cheaper processor platform can take on the additional load within the incremented time constraint, the segments of the load are reallocated from the more expensive processor platforms to the less expensive processor platforms. Once the segmentation has been optimized, the load segments are sent to each distributed processor through interface 307 and along transmission lines 311.

The controller 300 can be one of the processors which is allocated a portion of the divided load. CPU 301 would process its allocated segment after it had performed the function of the controller.

Figure 4:
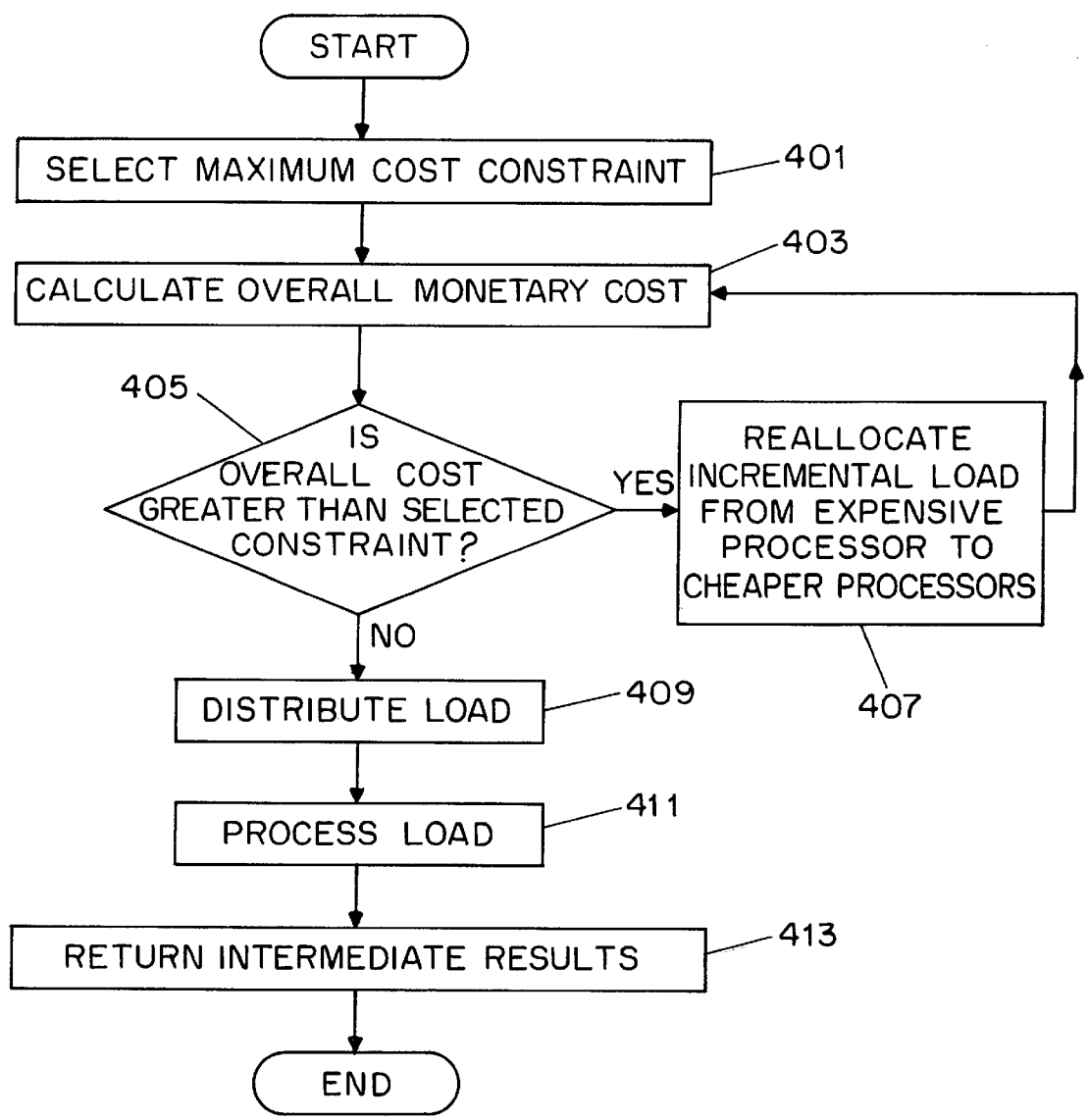
FIG. 4 shows a method to optimize the finish time while remaining within a selected cost constraint.

FIG. 4 shows the steps of a technique for minimizing the finish time of the load sharing distribution by a controller when a final cost ceiling is selected by the originator of the job. This technique is used, for example, when a user wants to process a divisible load or task the quickest way but for less than $25. The controller will receive the cost ceiling data and allocate the load or task accordingly to meet the cost ceiling while extending the finish time as little as possible.

Step 401 allows the user to select a maximum cost constraint for a particular job to be processed in a distributed system. The cost constraint information can be sent from the job queue with the divisible load to the controller 103, can be preselected for the system or can be entered directly into the controller via a keyboard, data file or other input device. The cost constraint can also be standard for all jobs from a particular user or group or users. For example, a user can require that all jobs should be processed for under $10.

Step 403 calculates the overall cost of the divisible job to be distributed among the available processor platforms in the network. The overall cost is equal to the summation of the monetary cost (cost/unit load) of each processor platforms and their associated data links multiplied by the fraction of the load or task being processed on that processor multiplied by the size of the overall load or task. Task size can be computed based on such factors as the complexity of the task and the necessary data inputs. The cost is minimized by placing as much of the load or task on the processor platforms with associated data links having a relatively low resource utilization cost while still completing the processing within an acceptable finish time.

The initial allocation of the loads preferably would be performed in accordance with the steps described in FIG. 2A. This will minimize the reallocations necessary to achieve the objective of reducing the overall monetary cost below a cost constraint. The optimization technique described in FIG. 2A could also be performed initially, but it is not required to be performed. Alternatively, any type of initial distribution including random distribution could be performed. The technique in FIG. 4 will reallocate the processor platform assignments to be below a selected cost constraint.

Step 405 determines if the calculated overall cost is greater than the selected cost constraint. If the overall cost is greater, the technique jumps to step 407. If the overall cost is not greater, then the cost is within the selected cost constraint and the optimization technique is complete. The technique then continues with step 409.

Step 407 reallocates an incremental portion of the load from the most expensive processor platform to the cheaper processor platforms (which reduces cost but most likely decreases speed). In order to minimize the finishing time given a cost ceiling, all the processor platforms which have been allocated segments of the load must stop processing at or very close to the same time. Thus, each of the cheaper processor platforms with associated data links will receive a portion of the reallocated load based upon the speed of the individual processor receiving the incremental load. A processor X that is twice as fast as a processor Y will receive a larger portion of the incremental load because it can process more of the load while being able to finish processing its load at or very near the same time as processor Y. Thus, the overall finishing time will be marginally increased but still minimized for a given cost ceiling. The size of the incremental portion reallocated between processors depends on the actual size of load and could range, for example, from 1% to 5% to 100% of the load segment. A load reallocation to a cheaper processor platform will by definition decrease the overall cost of the processing the load. The process then continues with step 403 to determine if the decrease in cost is sufficient to make the overall monetary cost become equal to or below the monetary cost ceiling.

Step 409 distributes the load to the selected processor platforms using the determined allocation in the previous steps. The cheapest available processor platform will be sent its allocated portion first and the other selected processors will be sent their portion in an ascending order according to the monetary cost of each processor. Alternatively, smaller portions of each allocated segment can be sent to each processor so that the processors can begin to operate on their load or task segment sooner. The controller will keep distributing the remaining smaller segments until all the allocated segments are distributed.

Step 411 processes each of the allocated load or task portions on the assigned distributed processor platforms. Each load is processed on a distributed processor platform as soon as it is received from the controller.

Step 413 returns the intermediate results of all the segments of the divisible loads or tasks which were processed on the distributed processors to the controller. This function may entail further calculations such as adding the intermediate results together, concatenating the resultant data from each processor together to form a solution or performing other operations on the results from partitioned sub-tasks. The job result is then complete. It can be stored in a memory, delivered back to the originator of the job or selected destination or used in any other desired manner.

When optimizing the finish time of a load allocation without regard for the monetary cost, all of the distributed processors must stop processing at or near the same time. If this was not the case, then some of the processors would be idle while other processors are busy. However, when monetary costs are a factor, it may be more efficient to not use the more expensive processor platforms while the less costly processor platforms operate for a greater time period. The technique for optimally allocating a divisible load based on monetary costs is different from one based simply on speed of the processors and their finish time.

Figure 5:
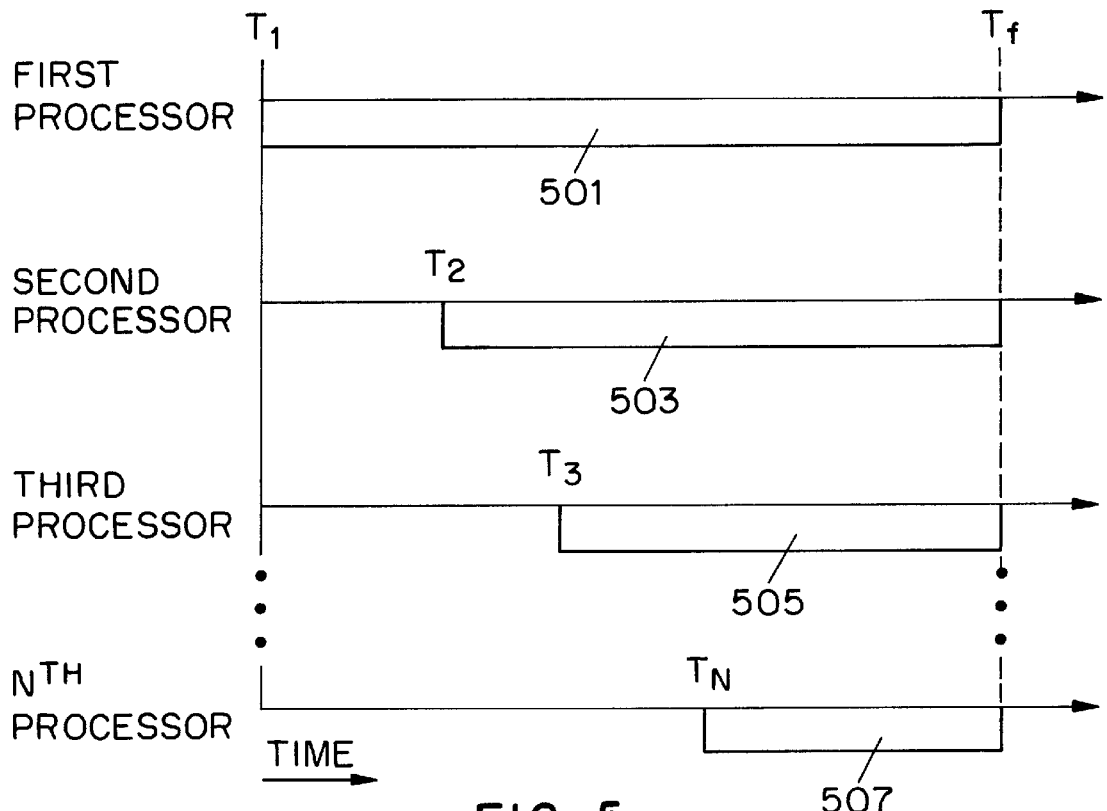
FIG. 5 is a timing diagram of the initial allocation of a distributed load in accordance with the invention.

FIG. 5 shows a timing diagram of N interconnected processor platforms participating in an application of the load sharing technique described in FIGS. 2A, 2B and 2C. In this example, the first processor platform 501 acts as both the controller and a processor platform which operates on a segment of the divisible load. Each processing platform in this example contains two separate processors, a main processor and a front end processor for transmitting and receiving data over its associated data conduit at the same time the main processor is operating. In this example, the load or task is divided and sent in a serial manner to each of the other distributed processors. The loads are apportioned so that the finish time of all the load or task segments occur at the same time. FIG. 5 shows the computation time of a first processor which acts as the controller and immediately processes its portion of the load. The process time block 501 for the first processor platform starts at $t=T_1$ and processes the load segment until $t=T_f$. The other processor platforms are transmitted their respective load shares in succession The process time for the second processor platform (as shown by processing block 503) starts at time $T_2$ and processes until $T_f$. The process time for the third processor platform (as shown by processing block 505) starts at time $T_3$ and processes until $T_f$. The process time for the Nth processor platform (as shown by processing block 507) starts at time $T_N$ and processes until $T_f$. The delay of the start of each processor is due to the successive transmission times over the data links of the load segments from the controller to each processor platform. The initial allocation ensures the cheapest monetary cost while still finishing the entire job by $T_f$ (excluding the time to transmit the results back to the controller). The timing diagram corresponds to the operation of steps 201 to 209 of FIG. 2A before further optimization and reduction to the monetary cost of the job.

Figure 6:
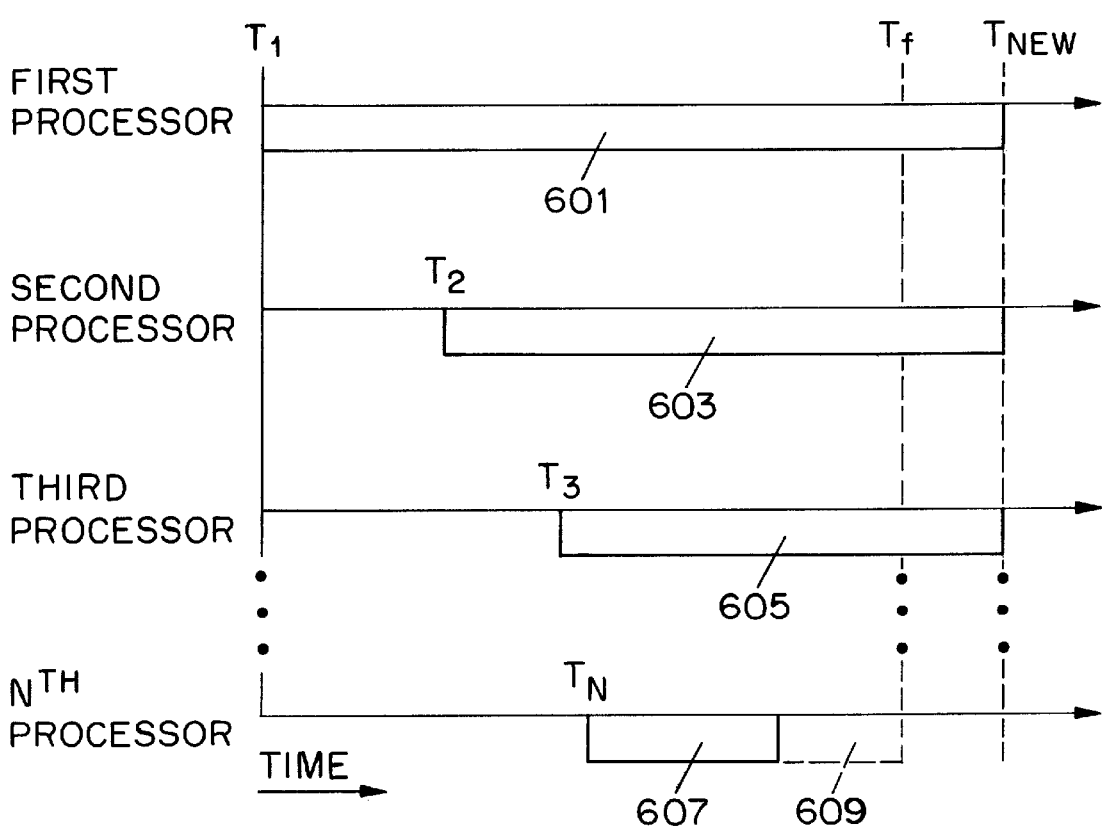
FIG. 6 is a timing diagram of the distributed load after it has been optimized to minimize the overall monetary cost when the finish time is increased incrementally.

FIG. 6 shows a timing diagram of N interconnected processor platforms when further reducing the monetary cost by incrementally increasing the finish time to an acceptable level. In this diagram, the finish time after the initial allocation is extended to $T_{new}$. The first processor platform now processes for a longer time as shown by processing block 601 starting at time $T_1$ and running until $T_{new}$. The extra load was reallocated from the most expensive processor platform $T_N$ and added to the load of the first processor platform. Other cheaper processor platforms also had their processing loads extended (as shown in processing blocks 603 and 605) by reallocating portions of loads or tasks away from the expensive processor platforms. The relatively expensive Nth processor now has a finish time less than the original time $T_f$ (as shown by processing block 607) because a portion of its load (shown as dashed portion 609) has been reallocated to the other processor platforms. The result is that the overall monetary cost of the job decreases while the finish time is increased incrementally. The monetary cost/finish time tradeoff can be decided by the job provider, an operator or other conventional means. The proper balance between the monetary cost and finish time is indicated to the controller through transferred data, data protocols or separate input to the controller.

Figure 7:
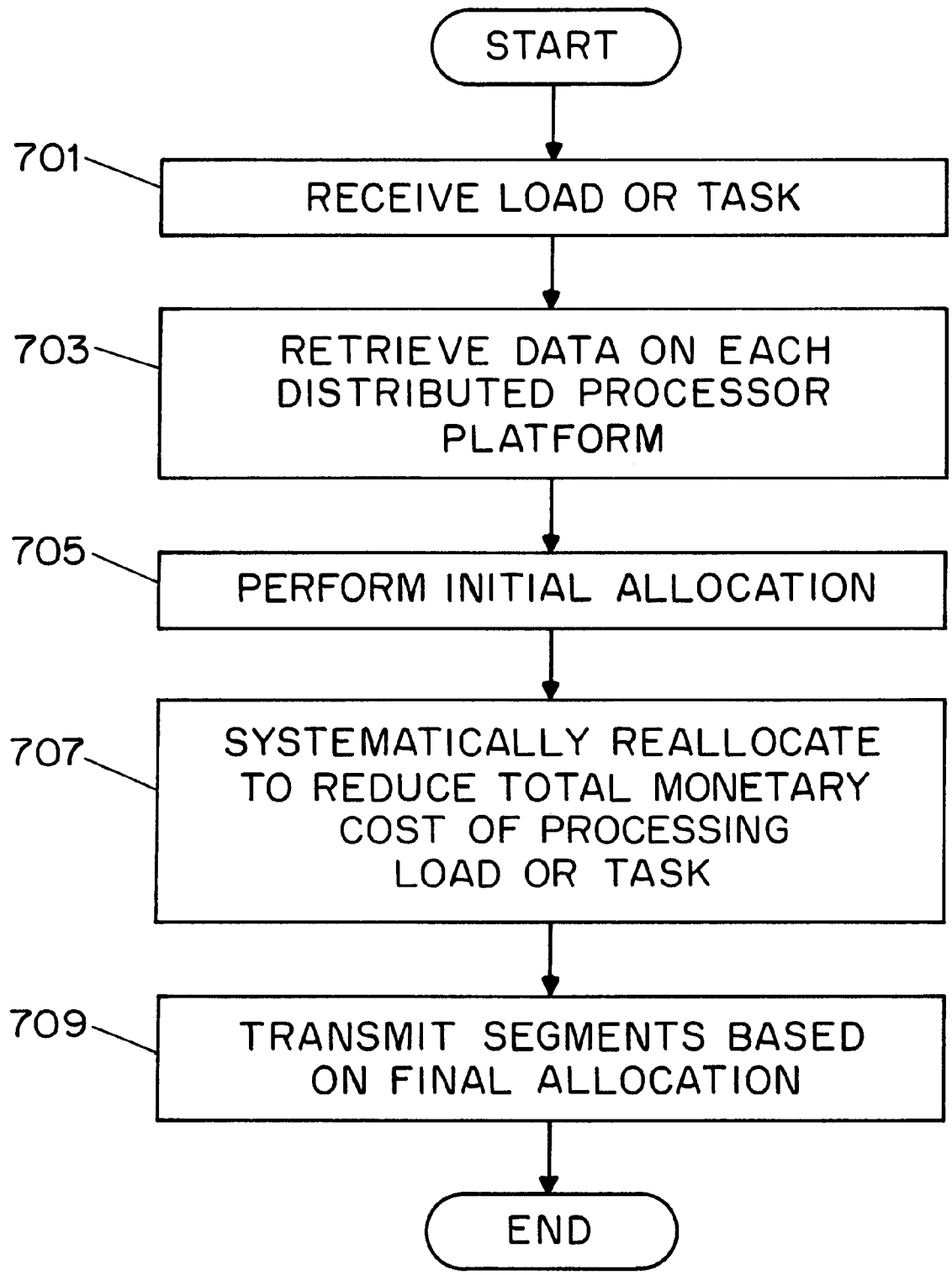
FIG. 7 shows the steps for performing a load or task allocation while optimizing the overall monetary cost of processing the load or task for an alternate embodiment.
Figure 8:
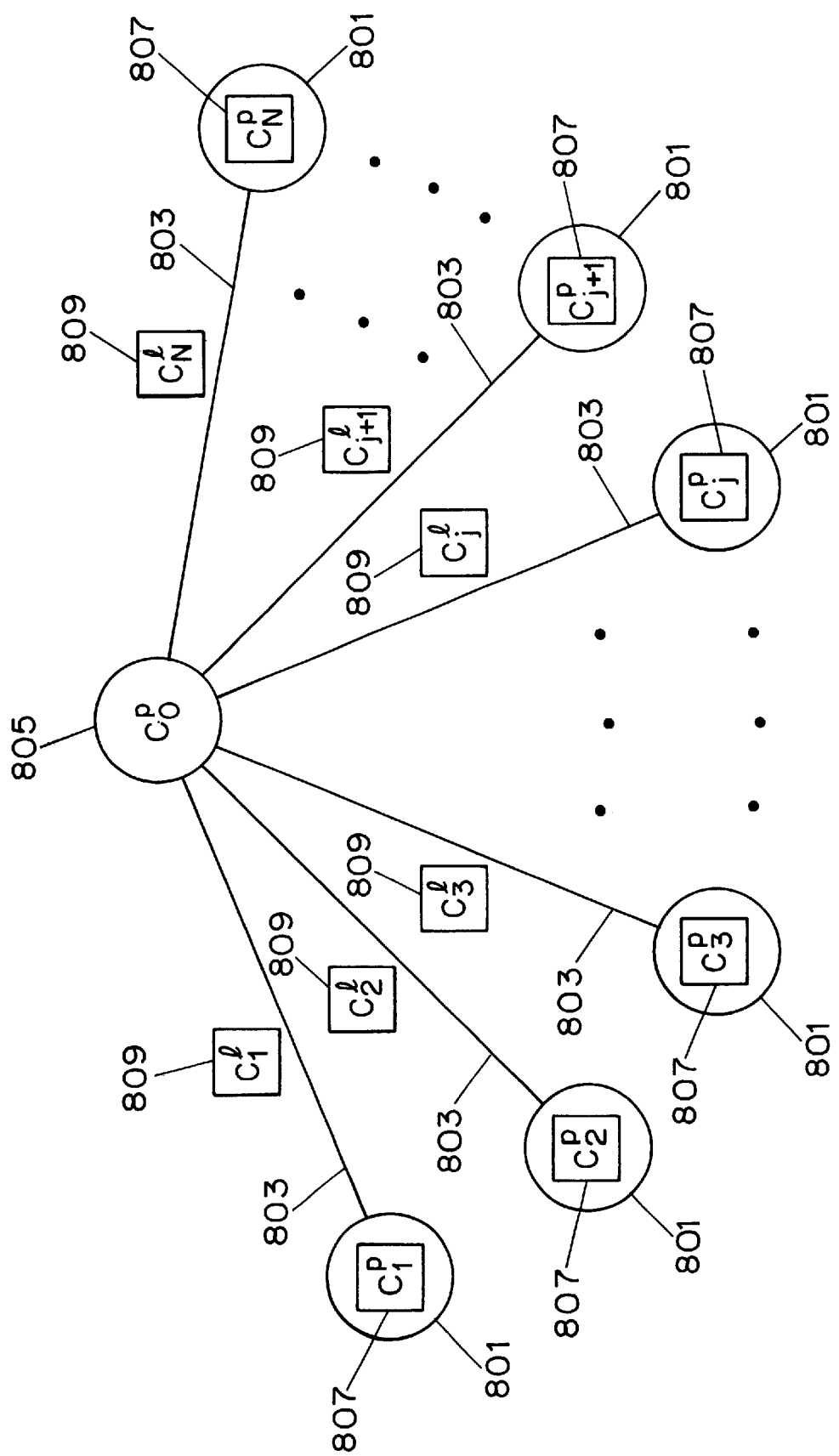
FIG. 8 shows a representation of a system of distributed processor platforms with associated data links in connection with FIG. 7.

An alterative embodiment of minimizing the overall monetary cost of a distributed job is described with respect to FIGS. 7, 8 and 9. FIG. 7 shows a flow chart of the general steps for performing the load or task allocation while optimizing the overall monetary cost of processing the load or task. Step 701 receives the load or task at the controller. Step 703 retrieves data on each of the distributed processor platforms. The retrieved data is explained in connection with the explanation of FIG. 1C. Step 705 then performs an initial allocation which is not based upon the resource utilization costs but can be the quickest allocation, a random allocation or any other desired allocation. In this embodiment, the initial allocation does not affect the final allocation because an optimization technique will be applied to the initial allocation. Step 707 then systemically reallocates the initial allocation of load segments to processor platforms in order to reduce the overall monetary cost of processing the entire load or task. The reallocation is performed using a pair-wise swapping technique which is described in more detail below. Step 709 then transmits the segments to the processor platforms based upon the final allocation. The final allocation will have minimized the overall cost of processing the load or task.

The following description is a more detailed explanation of the optimization technique described in FIG. 7. FIG. 8 shows a representation of a single level tree network with associated resource utilization costs for both the nodes 801 (processor platforms) and the platform data links 803. All the processor platforms 801 $p_1, \ldots p_N$ are connected to the controller 805 $p_o$ via data links 803 $l_1, l_2, \ldots, l_N$. Associated with the links and processors are the associated link cost coefficients 809, $c_1^l, c_2^l, \ldots c_N^l$ and processor cost coefficients 807 $c_0^P, c_1^P, c_2^P, \ldots, c_N^P$, respectively. The controller, which is the only processor at which the load arrives, partitions a total processing load into (N+1) segments, keeps its own segment and distributes the other segments $a_1, a_2, \ldots, a_N$ the children processors $p_1, p_2, \ldots, p_N$ respectively and sequentially. Each processor begins computing immediately after receiving its assigned segment of load and continues without any interruption until all its assigned load segments have been processed.

For clarity, a sequence of load distribution from the controller to the processor platforms in a single-level tree network is represented by an ordered set as below, $$\Theta = \{p_0, (l_1, p_1), (l_2, p_2), \ldots (l_j, p_j)(l_N, p_N)\}$$

where $(l^j, p_j)$ represents the $j^{th}$ processor platform $(p_j)$ connected to the controller processor $(p_0)$ via the $j^{th}$ link $(l_j)$.

This ordered set represent a sequence in which the controller distributes load to the available processor platforms. Using this optimization technique, the platform processors can be allocated segments of the load or task in any order initially. In this example, the sequence of load distribution (or "sequence") is from left to right.

In order to better explain the optimization technique, the following terms are defined:

$a_i$: The load fraction assigned to the $i^{th}$ processor platform.

$w_i$: The inverse of the computing speed of the $i^{th}$ processor platform.

$z_i$: The inverse of the link speed of the $i^{th}$ data link.

$T_{cp}$: Time taken to process an entire load by a standard processor platform, $w_{standard}=1$.

$T_{cm}$: Time taken to communicate an entire load by a standard data link, $z_{standard}=1$.

$T_f$: The finish time of an entire load, assuming that the load is delivered to the controller at time zero.

a: Load distribution vector with each element, $a_i$, representing the load assigned to the $i^{th}$ processor platform.

A closed-formed expression of a fraction of load assigned to each processor is derived in order to minimize the overall monetary cost of the distributed processing. It is based on the cost efficient load distribution principle that requires all processors with non-zero load to stop computing at the same instant of time.

Referring to the timing diagram as shown in FIG. 5 showing the initial serial distribution of a load or task to processor platforms, a fundamental recursive equation is derived as $$a_i w_i T_{cp} = a_{i+1} z_{i+1} T_{cm} + a_{i+1} w_{i+1} T_{cp} \quad i = 0, \ldots, N-1$$

It can be written in another form as, $$a_{i+1} = k_i a_i = \left(\prod_{j=0}^{i} k_j\right) a_0 \quad i = 0, \ldots, N-1$$

where $$k_i = \frac{a_{i+1}}{a_i}$$

$$= \frac{w_i T_{cp}}{(z_{i+1} T_{cm} + w_{i+1} T_{cp})} \quad i = 0, \ldots, N-1$$

Clearly, from the equations there are N equations and N+1 unknowns. An additional equation, the normalization equation, is needed in order to solve this system of equations. The normalization equation is given as below.

$$a_0 a_1 + \ldots + a_N = 1$$

$$\sum_{i=0}^{N} a_i = 1$$

With the normalization equation, one then resolves the recursive equations to obtain the closed-form expression of $a_0$, the fraction of load assigned to the root processor. Once $a_0$ is known, the other processor load fractions can be obtained by substituting $a_0$ into the above equation and solving them recursively as follows:

$$a_0 = \left[1 + \sum_{i=1}^{N}\left[\prod_{j=0}^{i-1} k_j\right]\right]^{-1}$$

$$= [1 + k_0 + k_0 k_1 + \ldots + k_0 k_1 \ldots k_{N-1}]^{-1}$$

$$= \left[1 + \frac{w_v T_{cp}}{(z_1 T_{cm} + w_1 T_{cp})} + \ldots + \frac{\prod_{i=0}^{N-1}(w_i T_{cp})}{\prod_{i=1}^{N}(z_i T_{cm} + w_i T_{cp})}\right]^{-1}$$

$$= \frac{1}{D}\prod_{i=1}^{N}(z_i T_{cm} + w_i T_{cp})$$

By substituting the above equations for each of i, one has:

$$a_1 = k_0 a_0$$

$$= \frac{w_v T_{cp}}{(z_1 T_{cm} + w_1 T_{cp})} \frac{1}{D}\prod_{i=1}^{N}(z_i T_{cm} + w_i T_{cp})$$

$$= \frac{1}{D}(w_0 T_{cp})\prod_{i=2}^{N}(z_i T_{cm} + w_i T_{cp})$$

$$a_2 = k_1 a_1$$

$$= \frac{w_1 T_{cp}}{(z_2 T_{cm} + w_2 T_{cp})}(w_0 T_{cp})\frac{1}{D}\prod_{i=2}^{N}(z_i T_{cm} + w_i T_{cp})$$

$$= \frac{1}{D}(w_0 T_{cp})(w_1 T_{cp})\prod_{i=3}^{N}(z_i T_{cm} + w_i T_{cp})$$

$$a_n = k_{n-1} a_{n-1}$$

$$= \frac{1}{D}\prod_{i+0}^{n-1}(w_i T_{cp})\prod_{i=n+1}^{N}(z_i T_{cm} + w_i T_{cp})$$

$$a_N = k_{N-1} a_{N-1}$$

$$= \frac{1}{D}\prod_{i=0}^{N-1}(w_i T_{cp})$$

where:

$$D = \prod_{n=1}^{N}(z_i T_{cm} + w_i T_{cp}) + \sum_{i=N+1}^{N}\left(\prod_{i-0}^{n-1}(w_i T_{cp})\prod_{i=n+1}^{N}(z_i T_{cm} + w_i T_{cp})\right)$$

Here:

$$w_0 T_{cp} = \prod_{i=1}^{0}(w_i T_{cp})$$

$$1 = \prod_{i=N+1}^{N}(z_i T_{cm} + w_i T_{cp})$$

These sets of equations for individual fractions of load are the essential tools needed to compute all costs that are associated with a single-level tree network, such as the total cost or an individual cost associated with a link or a processor. Note that to arrive at the closed-form expressions of the fraction of load for each processor, one has considered a particular sequence of load distribution. Therefore, should it be reordered, these closed-form expressions will change when a current sequence undergoes a sequencing procedure.

Due to its simplicity in reducing the number of neighbors in searching for an optimal solution, adjacent pair-wise swapping is used as a sequencing procedure. The goal is to obtain a sequence of load distribution that is cost efficient. Through a series of adjacent pair-wise swaps, one is able to obtain a cost efficient total cost sequence.

Adjacent pair-wise swapping refers to the interchange of positions of two adjacent link-processor pairs in the current sequence, keeping all other link-processor pairs in their respective positions. Under the current sequence a link-processor pair j is assigned a fraction of load and followed by an assignment of load to the $(j+1)^{st}$ link-processor pair. After adjacent pair-wise swapping, the $(j+1)^{st}$ link-processor pair is assigned a fraction of load before the $j^{th}$ link-processor pair is assigned a fraction of load.

Consider a load distribution sequence called the "current" sequence. A swapped sequence is a sequence obtained by implementing an adjacent pair-wise swap of one of the adjacent link-processor pairs of the current sequence.

A cost efficient sequencing technique using pair-wise swapping and based on a greedy strategy is described. It makes use of the above theorems to check if a current sequence could be improved in terms of total cost; and a greedy strategy is then applied to identify a position in a sequence to swap in order to yield the best improvement. The technique continues to check the conditions for swapping until no further improvement can be made and then terminates.

A greedy strategy is a strategy that finds an efficient solution by making a series of choices. At each step, it chooses the best choice at that moment. That is, the technique makes a locally optimal choice with the hope that this choice will lead to a globally optimal solution. It is quite a simple approach with no memory and no element of look-ahead and backtracking involved. A local search attempts to find a solution or a sequence better than the current one through a search in the neighborhood of the current sequence. Two sequences are neighbors if one can be obtained from the other by one adjacent pair-wise swap. There are (N–1) sequences in the neighborhood of any sequence.

Based on the concept of the greedy strategy and local search, at each step the technique searches its neighbors and finds the best one in terms of the lowest total cost and adopts it as the next sequence. It continues until no further improvement in $C_{total}$ can be made, then it stops. The total cost is improved in each step until the total cost cannot be reduced any further.

An example of running the greedy cost efficient sequencing technique on a single-level tree network will now be described. In this example there are five distributed processor platforms, one controller and five data links, i.e., N=5. Processor 0 is assumed to be the controller processor. It distributes fractions of load or a task to all of the other distributed processor platforms. Each iteration, the greedy cost efficient sequencing technique checks the condition associated with each adjacent link-processor pair and computes the total cost of the corresponding network. If the condition indicates that swapping adjacent pairs will be beneficial, the total cost will be computed after the swap takes place. Otherwise, the associated total cost is set to that of a current sequence of load distribution without swapping.

In this example, Swap[j]=1 means, that a condition of an adjacent pair of the $(j)^{th}$ link-processor pair and the $(j+1)^{st}$ link-processor pair has a lower monetary cost for the two swapped link-processor pairs than before the swap. Therefore it is better to swap the adjacent pairs and the corresponding total cost is given by C_total[j]. Note that in this example, N=5. Thus, the number of adjacent link-processor pairs is four. This is the range of j. Recall that an adjacent pair-wise swapping is applied only to the distributer processor platforms. The controller does not participate during the process in this example. The example also indicates which adjacent pair is selected to be swapped. It is based upon the resulting total cost of the adjacent pair that has the lowest value. The new sequence of load distribution is given along with its total cost, C_total.

An initial set of parameters for the allocation of the segmented load or task in the example is given as below.

| ## Initial Parameter Set ## | | | | |
|---|---|---|---|---|
| Pair | $z_i$ | $w_i$ | $C_1^1$ | $C_i^P$ |
| 0 | 0.0 | 8.0 | 0.0 | 18.0 |
| 1 | 4.0 | 3.0 | 16.0 | 15.0 |
| 2 | 5.0 | 1.0 | 6.0 | 18.0 |
| 3 | 9.0 | 7.0 | 7.0 | 1.0 |
| 4 | 2.0 | 9.0 | 9.0 | 14.0 |
| 5 | 6.0 | 2.0 | 12.0 | 9.0 |

Tcm = 4.0, Tcp = 3.0

The first iteration of greedy pair-wise swapping occurs as follows:
The current C_total is 373.054.
    Swap[1] is 1: C_total[1] is 306.15580222
    Swap[2] is 0: C_total[2] is 373.05490384
    Swap[3] is 0: C_total[3] is 373.05490384
    Swap[4] is 1: C_total[4] is 372.70558376
The adjacent swapped pairs will be pair 1 and pair 2.
A new sequence of load distribution is

| Pair | $z_i$ | $w_i$ | $C_1^1$ | $C_i^P$ |
|---|---|---|---|---|
| 0 | 00 | 8.0 | 0.0 | 18.0 |
| 1 | 5.0 | 1.0 | 6.0 | 18.0 |
| 2 | 4.0 | 3.0 | 16.0 | 15.0 |
| 3 | 9.0 | 7.0 | 7.0 | 1.0 |
| 4 | 2.0 | 9.0 | 9.0 | 14.0 |
| 5 | 6.0 | 2.0 | 12.0 | 9.0 |

C_total of the new sequence is 306.156.

C_total of the new sequence is 306.156.
The second iteration occurs as follows:
The current C_total is 306.156.
    Swap[1] is 0: C_total[1] is 306.15580222
    Swap[2] is 1: C_total[2] is 302.52174339
    Swap[3] is 0: C_total[3] is 306.15580222
    Swap[4] is 1: C_total[4] is 305.58804822
The adjacent swapped pairs will be pair 2 and pair 3.
A new sequence of load distribution is

| Pair | $z_i$ | $w_i$ | $C_1^1$ | $C_i^P$ |
|---|---|---|---|---|
| 0 | 0.0 | 8.0 | 0.0 | 18.0 |
| 1 | 5.0 | 1.0 | 6.0 | 18.0 |
| 2 | 9.0 | 7.0 | 7.0 | 1.0 |
| 3 | 4.0 | 3.0 | 16.0 | 15.0 |
| 4 | 2.0 | 9.0 | 9.0 | 14.0 |
| 5 | 6.0 | 2.0 | 12.0 | 9.0 |

C_total of the new sequence is 302.522.

The third iteration occurs as follows:
The current C_total is 302.522.
    Swap[1] is 0: C_total[1] is 302.52174339
    Swap[2] is 0: C_total[2] is 302.52174339
    Swap[3] is 0: C_total[3] is 302.52174339
    Swap[4] is 1: C_total[4] is 301.93180413
The adjacent swapped pairs will be pair 4 and pair 5.
A new sequence of load distribution is

| Pair | $z_i$ | $w_i$ | $C_1^1$ | $C_i^P$ |
|---|---|---|---|---|
| 0 | 0.0 | 8.0 | 0.0 | 18.0 |
| 1 | 5.0 | 1.0 | 6.0 | 18.0 |
| 2 | 9.0 | 7.0 | 7.0 | 1.0 |
| 3 | 4.0 | 3.0 | 16.0 | 15.0 |
| 4 | 6.0 | 2.0 | 12.0 | 9.0 |
| 5 | 2.0 | 9.0 | 9.0 | 14.0 |

C_total of the new sequence is 301.932.

A fourth iteration occurs as follows:
The current C_total is 301.932.
    Swap[1] is 0: C_total[1] is 301.93180413
    Swap[2] is 0: C_total[2] is 301.93180413
    Swap[3] is 1: C_total[3] is 300.86064421
    Swap[4] is 0: C_total[4] is 301.93180413
The adjacent swapped pairs will be pair 3 and pair 4.
A new sequence of load distribution is

| Pair | $z_i$ | $w_i$ | $C_1^1$ | $C_i^P$ |
|---|---|---|---|---|
| 0 | 0.0 | 8.0 | 0.0 | 18.0 |
| 1 | 5.0 | 1.0 | 6.0 | 18.0 |
| 2 | 9.0 | 7.0 | 7.0 | 1.0 |
| 3 | 6.0 | 2.0 | 12.0 | 9.0 |
| 4 | 4.0 | 3.0 | 16.0 | 15.0 |
| 5 | 2.0 | 9.0 | 9.0 | 14.0 |

C_total of the new sequence is 300.861.

A fifth iteration occurs as follows:
The current C_total is 300.861.
    Swap[1] is 0: C_total[1] is 300.86064421
    Swap[2] is 0: C_total[2] is 300.86064421
    Swap[3] is 0: C_total[3] is 300.86064421
    Swap[4] is 0: C_total[4] is 300.86064421
After this iteration, no swap is suggested. Therefore this is the final sequence. The final sequence of load distribution is

| Pair | $z_i$ | $w_i$ | $C_1^1$ | $C_i^P$ |
|---|---|---|---|---|
| 0 | 0.0 | 8.0 | 0.0 | 18.0 |
| 1 | 5.0 | 1.0 | 6.0 | 18.0 |
| 2 | 9.0 | 7.0 | 7.0 | 1.0 |
| 3 | 6.0 | 2.0 | 12.0 | 9.0 |
| 4 | 4.0 | 3.0 | 16.0 | 15.0 |
| 5 | 2.0 | 9.0 | 9.0 | 14.0 |

The minimum C_total is 300.861.

In each iteration the total cost is decreased. The sequence of load distribution is swapped according to the index of Swap[*]=1 with the lowest value of C_total[*]. The final sequence is one where there is no suggestion to swap any adjacent pairs. In addition, this final sequence is also the minimum total cost sequence which is indicated after running the exhaustive permutation technique based program.

FIG. 9 shows a table 901 of the average number of iterations 903 of swapping required for a set number of link-processor platform pairs 905 (children) in order to minimize the total cost of the distributed processor platforms and their data links. The results show that the disclosed technique can be applied to a large number of processor platforms without causing large processing delays. The data in the table was checked against an exhaustive search of total costs parameters in order to make sure the lowest cost was found after the stated number of iterations.

Other general optimization principles can be applied to optimize the overall monetary costs of a distributed processor platform system. One such optimization approach is called genetic techniques. Genetic techniques belong to a larger family of techniques known as evolutionary techniques which are efforts to apply concepts from the theory of biological evolution such as natural selection, reproduction, genetic diversity and propagation, species competition/cooperation and mutation to search optimization and machine learning problems.

In a genetic technique and "individual" in a population represents a particular solution to the problem at hand. Individuals may be represented by binary strings or other representations, depending on the problem. Over a number of generations of individuals a "survival of the fittest" phenomena takes place, at electronic speeds, with the best solutions in the final population. The following equation is used in the genetic optimization:

$$p_i = \frac{f_i}{\sum_{(i=1)}^{N} f_i}$$

Like a natural population, a population of solutions in the genetic technique approach reproduces in such a way that useful characteristics are reinforced in the population and harmful characteristics are eliminated from the population. Populations in genetic techniques are generally of a constant size with N individuals. Each individual is just a string of possibly binary) symbols. Some method is available for evaluating the "fitness" (really the objective function) of each individual. Let $f_1$ be the ith individual's fitness. For a new population, individuals are often chosen in proportion to their relative fitness, $p_1$ with probability:

The effect of this choice is to bias the population toward containing more "fitter" individuals. Naturally though, something is needed beyond this random selection to create new individuals. Two population mechanisms for introducing new individuals are mutation and crossover. In mutation, the more limited mechanism, bits in an individual are changed at random with a very small independent probability. This can be seen as an attempt to prevent convergence to a local minima/maxima by sampling other points in the solution space. In the more powerful crossover, characteristics of two parent individuals are combined to form two new individuals according to some rule(s) that makes sense for the problem at hand. An individual will take part in a crossover with some independent probability, which is often about 0.6. Usually the whole population is replaced after each cycle. This is referred to as a generational approach. There are other possibilities that have certain advantages. For instance, one could delete only the worst individuals each cycle. Genetic optimization would be used to optimize the lowest monetary cost for a set of parameters in place of the pair wise swapping technique described above.

Another general optimization principle which can be used is called a Tabu search. Tabu search is a heuristic approach used to direct techniques, such as descent techniques, to find good minima/maxima even in the presence of local optima. The key aspect of tabu search is that it incorporates memory regarding the optimization being performed in order to make better choices of parameters. Certain types of movement in the parameter space are made "tabu" (taboo) in order for the overall optimization technique to be able to escape from local optima. One can also use memory functions of different durations to provide diversity and intensity to the search.

Tabu search has been applied to a wide variety of optimization problems with a good deal of success. It can find excellent solutions, is relatively intuitive and simple to implement and it is relatively straightforward to incorporate new forms of constraints to existing optimization problems. It has been applied to such generic problems as scheduling, graph problems, sequencing, traveling salesman problems and assignment. Tabu search can be tailored-usually in a straightforward manner—to individual optimization problems such as the resource utilization cost optimization in the present case.

The tabu optimization technique is founded on three main principles. They are the following: (1) the utilization of flexible attribute based memory structures. These allow objective functions and historical search information to be made better use of than in rigid memory structures (e.g., as in branch and bound); (2) a control based on the interaction between tabu restrictions and aspiration criteria, this control makes use of the memory structure; and (3) the inclusion of memory functions with different time durations. These time durations can range from short term to long term to allow intensification of the search. Intensification strategies produce a bias toward move types and solution characteristics that have a historical basis of being beneficial. Another purpose is diversification of the search which produces a bias to send the search into new regions.

The philosophy behind tabu restrictions is to prevent the reversal/repetition of certain types of moves with specific attributes. By doing this, "cycling" that returns an optimization procedure to a local optima can be avoided. These are then evaluated and the evaluation may be direct if the associated computation can be done efficiently or approximate if the computation is complex or not possible at that move.

Aspiration criteria allow a suspension of the tabu restrictions if a significant improvement in the solution can be obtained. Aspiration criteria can be implemented on either a short term basis or a long term basis. There are subtle interactions between tabu restrictions and aspiration criteria that must be considered. In target analysis some initial effort is made to find representative optimal or nearly optimal solutions for a class of problems. These solutions are known as target solutions. These solutions can then be used to evaluate potential moves that will be likely to be successful/unsuccessful. This can also help to develop intensification and diversity strategies. In fact some prior statistical analysis can be made of moves that are likely to be successful in order to aid the search.

Tabu optimization can be used to optimize the lowest cost in place of the greedy technique or genetic techniques. Alternatively, other optimization schemes can also be used in a similar manner such as simulated annealing which is an optimization scheme known in the art. All these three techniques are essentially based on the same fundamental concept, i.e., a local search with pair-wise swapping. The selection of the specific technique will be based upon, for example, the number of processor platforms available, the associated resource utilization costs of those platforms and the complexity of the load or task being processed.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

We claim:

1. A system for distributing a computing job and optimizing said distributed job's total associated monetary cost of processing said job, comprising:

a plurality of processor platforms, each with an associated resource utilization cost;

a controller for dividing said computing job into segments and allocating said segments to at least two of said processor platforms; and a network for connecting said processor platforms and said controller;

wherein said allocation of said segments includes an initial allocation to at least two of said processor platforms, retrieval of said processor platform's resource utilization cost information and a further reallocation of at least a portion of said segments to reduce said total monetary cost of said processing job responsive to said retrieved resource utilization costs.

2. A system of claim 1, wherein said controller further retrieves said processor platform's associated data link monetary cost information.

3. The system of claim 2, wherein said reallocation is further responsive to said retrieved data link monetary cost information.

4. The system of claim 2, wherein said retrieved data link cost information is not derived from said processor platform's associated resource utilization cost.

5. The system of claim 1, wherein said retrieved processor platform's resource utilization cost information comprises processor speed data and operating cost data.

6. The system of claim 1, wherein said retrieved processor platform's resource utilization cost information of at least one of said processor platforms is preselected for said at least one processor platform.

7. The system of claim 6, wherein said preselected resource utilization cost is not derived from processor speed data.

8. The system of claim 1, wherein said controller further reallocates said divisible jobs among said processors to reduce said computing job's monetary cost below a selected cost constraint.

9. The system of claim 8, wherein said reallocation further minimizes said computing job's finish time.

10. The system of claim 1, wherein each of said processors' segment finish times are substantially equal.

11. The system of claim 1, wherein said reallocation is performed using pair-wise swapping.

12. The system of claim 11, wherein said reallocation is performed using adjacent pair-wise swapping.

13. A method for distributing a computing job among a plurality of processor platforms and optimizing said distributed job's total associated monetary cost for processing said job, comprising the steps of:

determining a resource utilization cost associated with each said processor platform;

dividing said computing job into segments;

initially allocating said segments to said processors; and reallocating at least a portion of said segments to reduce said total monetary cost of said processing job responsive to said determined associated resource utilization cost of each said processor platform.

14. The method of claim 13, wherein said determining step polls each of said processor platforms to determine said resource utilization cost.

15. The method of claim 14, further including the step of polling each of said processor platforms to determine its availability and wherein said allocation step is responsive to said availability.

16. The method of claim 13, wherein said determining step checks a predesignated memory location which stores said resource utilization cost information of each said processor.

17. The method of claim 13, further including the step of reading a predesignated memory location which stores each of said processors availability and wherein said allocating step is responsive to said availability.

18. The method of claim 13, wherein said determining step includes retrieving said resource utilization cost information of said processor and said associated data link cost information for each said processor.

19. The method of claim 18, wherein said reallocation step is further responsive to said retrieved associated data link cost information.

20. The method of claim 18, wherein said retrieved data link cost information for at least of one said processor platforms is preselected for said processor platform.

21. The method of claim 20, wherein said preselected processor resource utilization cost is not derived from processor speed data.

22. The method of claim 13, wherein said reallocation step uses pair-wise swapping to reduce said overall monetary cost.

23. The method of claim 22, wherein said pair-wise swapping is implemented utilizing a greedy optimization technique.

24. The method of claim 22, wherein said pair-wise swapping is implemented utilizing a tabu optimization technique.

25. The method of claim 22, wherein said pair-wise swapping is implemented utilizing a genetic optimization technique.

26. The method of claim 18, wherein said reallocation step includes reallocating portions of said segments distributed from said processors with high said associated monetary costs and high said associated data link monetary costs to said processors and said data links with relatively low said associated monetary costs.

27. The method of claim 13, wherein said computing job's finish time is incrementally extended during said reallocation step.

28. The method of claim 13, further including the step of optimizing said distribution of said divisible job to reduce said computing job's monetary cost below a selected cost constraint.

29. The method of claim 28, wherein said optimizing step further minimizes said computing job's finishing time.

30. The method of claim 13, further including the step of distributing said allocated segments and processing said allocated segments on said allocated processors.

31. The method of claim 13, wherein each of said allocated processors' segment finish times are substantially equal.

32. A controller for distributing a computing job and optimizing said job's total associated monetary cost comprising:

means for interfacing with a plurality of processor platforms, wherein each said processor platform has an associated resource utilization cost and an associated data link cost;

means for determining said resource utilization costs of said processors and said associated data link costs and for segmenting said computing job into segments to be initially allocated among said processors, said determining means being coupled to said interfacing means;

means for reallocating said initial allocation to reduce said total monetary cost of said processing job responsive to said determined resource utilization costs; and means for sending at least one of said allocated segments to at least one of said selected processors over said associated data link based upon said reallocation and for receiving intermediate results from said selected processors via said interface means.

33. The controller of claim 32, further including a means for retrieving resource utilization information for said plurality of processors.

34. The controller of claim 32, wherein said means for retrieving further retrieves said data link cost information for said associated data links.

35. The controller of claim 34, wherein said reallocating means is further responsive to said retrieved associated cost of said data links.

36. The controller of claim 32, wherein said controller has an associated resource utilization cost and is capable of being allocated one of said segments.

37. The controller of claim 32, wherein said reallocation means utilizes pair-wise swapping to optimize said total monetary cost.

* * * * *

UNITED STATES PATENT AND TRADEMARK OFFICE
CERTIFICATE OF CORRECTION

PATENT NO. : 6,370,560 B1
DATED : August 25, 2004
INVENTOR(S) : Robertazzi et al.

It is certified that error appears in the above-identified patent and that said Letters Patent is hereby corrected as shown below:

Title page,
Item [56], References Cited, OTHER PUBLICATIONS, "Banawan" reference, "heterogenous" should read -- heterogeneous --
Item [57], ABSTRACT,
Line 11, "cost processing" should read -- cost of processing --
Item [63], Related U.S. Application Data, "08/717,696" should read -- 08/714,696 --
Item [73], Assignee, "The Research Foundation of State of New York" should read -- The Research Foundation of State University of New York --

Column 3,
Line 63, "pentium" should read -- Pentium --

Column 5,
Line 45, "distributer" should read -- distributor --

Column 9,
Line 18, "trade offs" should read -- trade-offs --

Column 13,
Line 28, "alterative" should read -- alternative --

Column 14,
Line 6, "($l^j$, $p_j$)" should read -- ($l_j$, $p_j$) --
Line 8, "represent" should read -- represents --
Line 40, "$T_{cp}i=0, \ldots, N-1$" should read -- $T_{cp}\ i=0, \ldots, N-1$ -- (space after $T_{cp}$)
Line 59, "$a_0 a_1 + \ldots$" should read -- $a_0 + a_1 + \ldots$ --

Column 15,

Line 46, "$D = \prod_{n=1}^{N}$" should read -- $D = \prod_{i=1}^{N}$ --

Line 46, "$\sum_{i=N+1}^{N}$" should read -- $\sum_{n=1}^{N}$ --

UNITED STATES PATENT AND TRADEMARK OFFICE
CERTIFICATE OF CORRECTION

PATENT NO. : 6,370,560 B1
DATED : August 25, 2004
INVENTOR(S) : Robertazzi et al.

It is certified that error appears in the above-identified patent and that said Letters Patent is hereby corrected as shown below:

Column 15 (cont'd),

Line 46, "$\prod_{i-1}^{n-1}$" should read -- $\prod_{i=1}^{n-1}$ --

Line 55, "$\prod_{i=\}}^{0}$" should read -- $\prod_{i=0}^{0}$ --

Column 17,
Line 3, "distributer" should read -- distributor -- second table "00" should read -- 0.0 --
Line 45, delete line "C_total of the new sequence is 306.156"

Column 19,
Line 20, "and" should read -- an --
Line 25, "phenomena" should read -- phenomenon --
Line 40, "possibly binary)" should read -- (possibly binary) --
Line 44, "probability:" should read -- a probability which can be determined using the equation for $p_i$ set forth above. --
Line 65, "pair wise" should read -- pair-wise --

Column 20,
Line 16, "tailored-usually" (hyphen) should read -- tailored—usually -- (em dash)

Column 22,
Line 15, "processors" should read -- processors' --

Signed and Sealed this

Twelfth Day of April, 2005

JON W. DUDAS
*Director of the United States Patent and Trademark Office*